United States Patent
Collier

(10) Patent No.: US 7,094,339 B2
(45) Date of Patent: Aug. 22, 2006

(54) LIQUID-TREATING METHOD

(76) Inventor: Donald G. Collier, 39E Ledgenwood Rd., North Stonington, CT (US) 06359-1003

( * ) Notice: Subject to any disclaimer, the term of this patent is extended or adjusted under 35 U.S.C. 154(b) by 0 days.

(21) Appl. No.: 11/218,902

(22) Filed: Sep. 2, 2005

(65) Prior Publication Data

US 2006/0000765 A1    Jan. 5, 2006

Related U.S. Application Data

(62) Division of application No. 10/209,838, filed on Aug. 1, 2002, now Pat. No. 6,966,988.

(51) Int. Cl.
*B01D 29/00* (2006.01)
*B01D 35/02* (2006.01)
*F16L 4/08* (2006.01)

(52) U.S. Cl. .............. 210/167; 210/232; 210/423; 210/409; 210/295

(58) Field of Classification Search ............ 210/767, 210/435, 423, 437, 447, 451, 541, 295, 232, 210/409, 251; 137/550; 285/129.1, 133.21
See application file for complete search history.

(56) References Cited

U.S. PATENT DOCUMENTS

| | | |
|---|---|---|
| 302,343 A | 7/1884 | Kitton |
| 1,086,143 A | 2/1914 | Davidson |
| 1,406,272 A | 2/1922 | Morse |
| 3,743,096 A | 7/1973 | Harvey et al. |
| 3,831,983 A | 8/1974 | Stickler |
| 4,178,248 A | 12/1979 | Porter et al. |
| 4,529,515 A | 7/1985 | Selz |
| 4,948,270 A | 8/1990 | Minard et al. |
| 5,295,880 A | 3/1994 | Parker |
| 5,472,604 A | 12/1995 | Yang |
| 5,569,573 A * | 10/1996 | Takahashi et al. .......... 430/138 |
| 5,618,214 A | 4/1997 | Wyss et al. |
| 5,718,281 A * | 2/1998 | Bartalone et al. ............. 165/41 |
| 5,775,964 A | 7/1998 | Clark |
| 6,206,740 B1 | 3/2001 | Sholler |
| 6,217,755 B1 * | 4/2001 | Stifelman et al. ........... 210/116 |
| 6,221,242 B1 | 4/2001 | Deibel et al. |
| 6,966,988 B1 * | 11/2005 | Collier ....................... 210/541 |

* cited by examiner

*Primary Examiner*—Ana Fortuna
(74) *Attorney, Agent, or Firm*—Ira S. Dorman

(57) ABSTRACT

In the method, an adapter is substituted for the filter-enclosing cap of a conventional in-line strainer device to permit introduction into a plumbing system of a flushing solution withdrawn from an independent supply. The method is typically used for introducing antifreeze into the system for winterization purposes.

3 Claims, 2 Drawing Sheets

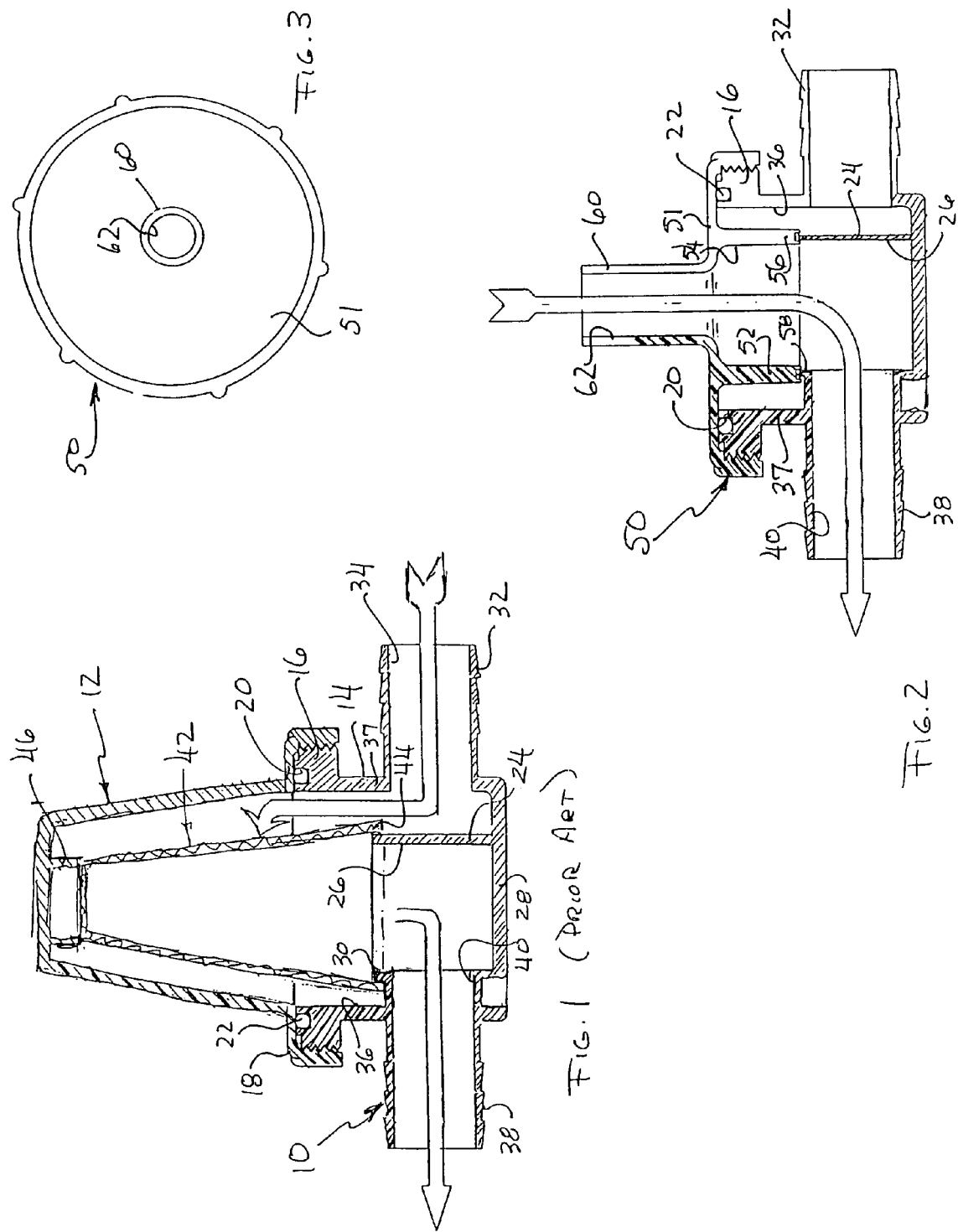

LIQUID-TREATING METHOD

CROSS-REFERENCE TO RELATED APPLICATION

This application is a divisional of application Ser. No. 10/209,838, filed Aug. 1, 2002 and now issued as U.S. Pat. No. 6,966,988, the entire specification of which is hereby incorporated hereinto by reference thereto.

BACKGROUND OF THE INVENTION

It is often important that plumbing systems be flushed periodically for the removal of contamination, deposits, and the like. It is well known moreover that in cold climates marine plumbing systems must be winterized, by flushing with an antifreeze liquid, to remove residual water and thereby prevent freezing.

In-line strainers, or filters, are widely used in marine plumbing systems for extracting foreign matter from the water stream so as to protect incorporated components, such as pumps in particular, from damage. The locations of installation of such devices provide sites at which flushing liquids can be introduced into the system. However, disconnecting existing hose clamps and pipe fittings in order to do so, and making the necessary reconnections, is often time-consuming and inconvenient, especially in instances in which the strainer device is not readily accessible, as is frequently the case.

The need for flushing of marine plumbing systems is common knowledge in the boating community, and is well recognized in the patent literature. For example, Parker U.S. Pat. No. 5,295,880 provides a flushing valve for use in the conduit that carries ambient water for cooling of inboard boat engines; Wyss et al. U.S. Pat. No. 5,618,214 discloses apparatus for permitting the introduction of fluids into a marine plumbing system, specifically for controlling colonization by marine animals and/or for winterizing purposes; and Sholler U.S. Pat. No. 6,206,740 provides apparatus for drawing antifreeze solution into a marine engine in preparation for winter storage.

SUMMARY OF THE INVENTION

It is a broad object of the present invention to provide a novel adapter which is quickly and easily attached to the base of a conventional in-line filter for readily converting the device to a liquid treatment assembly for flushing of a plumbing system in which it installed.

Other broad objects of the invention are to provide a novel liquid treatment assembly, and a novel method for flushing a plumbing system, which utilize the installed base component of a conventional in-line filter device.

It has now been found that certain of the foregoing and related objects of the invention are attained by the provision of a liquid treatment assembly for in-line installation in a plumbing system, comprising a base and an adapter disengageably assembled with one another and cooperatively defining a flushing chamber. The base and adapter have interior wall structures with interengaging confronting mouth portions that cooperatively define, within the flushing chamber, an inner compartment and an outer compartment, the base having outlet- and inlet-defining means in liquid flow communication with the inner and outer compartments, respectively. The wall structure of the base is constructed for seating a strainer or filter member over its mouth portion, and the inlet- and outlet-defining means are in flow communication thereacross when the adapter is not in place. In assembly, the adapter functions to block flow through the base inlet-defining means while, at the same time, establishing a liquid flow path from its own inlet-defining means to the base outlet-defining means, through the cooperatively defined inner compartment.

The base and adapter will usually have threaded portions for enabling their disengageable assembly. To facilitate mutual registration of the internal wall structures of the base and adapter (particularly when the parts are threadably interengaged), those structures will advantageously be generally cylindrical, with the adapter inlet-defining means desirably defining a flow path portion disposed in substantially coaxial relationship thereto.

The adapter may more specifically comprise an end wall having means extending peripherally thereon for engaging the base, with the interior wall structure thereof being continuous, disposed inwardly of the means for engaging, and extending from the end wall in a direction generally normal thereto to provide a well having an open mouth. The inlet- and outlet-defining means of the base will typically comprise connecting nipples, as will the inlet-defining means of the adapter.

Other objects of the invention are attained by the provision of an adapter for use in assembly with a base, for in-line installation in a plumbing system for treatment of liquid flowing therethrough. In its broad form the adapter comprises an end wall having means extending peripherally thereon for engaging a cooperating base, continuous interior wall structure extending from the end wall in a direction generally normal thereto and disposed inwardly of the means for engaging, to provide a well with an open mouth spaced from the end wall, and means defining a liquid flow passage into the well through the end wall. The means for engaging will advantageously comprise a threaded portion, the interior wall structure will usually be generally cylindrical, and the inlet-defining means will typically comprise a connecting nipple and will desirably define a flow path portion disposed in substantially coaxial relationship to the interior wall structure.

Additional objects of the invention are attained by the provision of a method for treating liquid in a plumbing system, using apparatus that includes a base, an adapter, a strainer member, and a cap member, constructed as described herein. The base is installed in a plumbing system with its inlet-defining means connected to receive liquid to be treated and with its outlet-defining means connected to discharge treated liquid. To configure the apparatus for filtering, the strainer member is seated over the mouth portion of the interior wall structure of the base and the cap member is assembled with the base to cooperatively define therewith a filtering chamber. Liquid to be treated is introduced into the inlet-defining means of the base while liquid is withdrawn from the base outlet-defining means, passing sequentially through the defined outer compartment, the strainer member, and the inner compartment. To configure the apparatus for flushing, the cap member and strainer are removed and the adapter is assembled with the base to cooperatively define therewith a flushing chamber. A treating liquid (such as antifreeze, for winterizing purposes) is introduced into the adapter inlet-defining mean and passes into the system through the inner compartment and the outlet-defining means of the base.

BRIEF DESCRIPTION OF THE DRAWINGS

FIG. 1 is a sectional view of a conventional in-line strainer device, suitable for use in a marine plumbing system;

FIG. 2 is sectional view of a liquid treatment assembly embodying the present invention;

FIG. 3 is a plan view of the adapter employed in the assembly of FIG. 2;

DETAILED DESCRIPTION OF THE PREFERRED AND ILLUSTRATED EMBODIMENT

Figure 5:
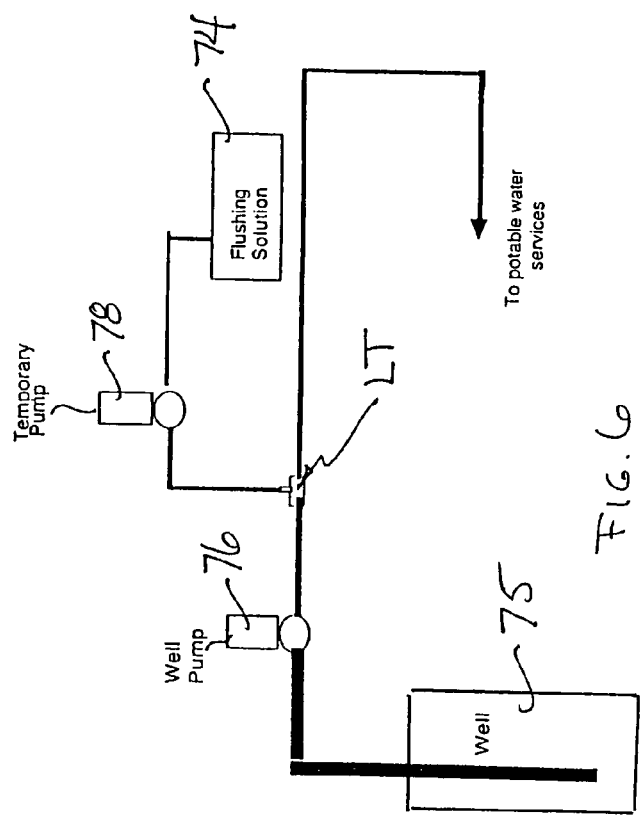
FIGS. 5 and 6 are schematic representations of plumbing systems into which the liquid treatment assembly of the invention is installed.

As seen in FIG. 1, the prior art strainer device, adapted for in-line installation in a marine plumbing system, consists of a base and a cap, generally designated respectively by the numerals 10 and 12; such a device as commercially available from ITT Jabsco company as its PUMPGARD Model 36200-0000. The base 10 of the strainer device has a cup-like body 14, surrounded at its upper, open end by a threaded lip 16; the lip 16 engages the threaded flange 18 on the cap 12 for assembly of the parts, and a circular groove 20, formed into the upper surface of the lip 16, receives an o-ring 22 for sealing the joint therebetween.

A cylindrical wall 24 extends upwardly from the bottom wall 28 of the body 14 and forms therewith an upwardly opening well 26 having a mouth defined by marginal structure 30. A barbed nipple 32 defines an inlet conduit 34 to the interior space 36 between the sidewall 37 of the body 14 and the cylindrical wall 34; a similar barbed nipple 38 defines an outlet conduit 40 from the well 26.

The lower edge portion 44 of a frustoconical strainer, or filter, generally designated by the numeral 42, is frictionally engaged upon the upper marginal portion 30 of the cylindrical wall 24. It is secured in position by the cap 12, acting through a short, depending retaining wall 46 which bears upon the upper end of the filter.

Figure 4:
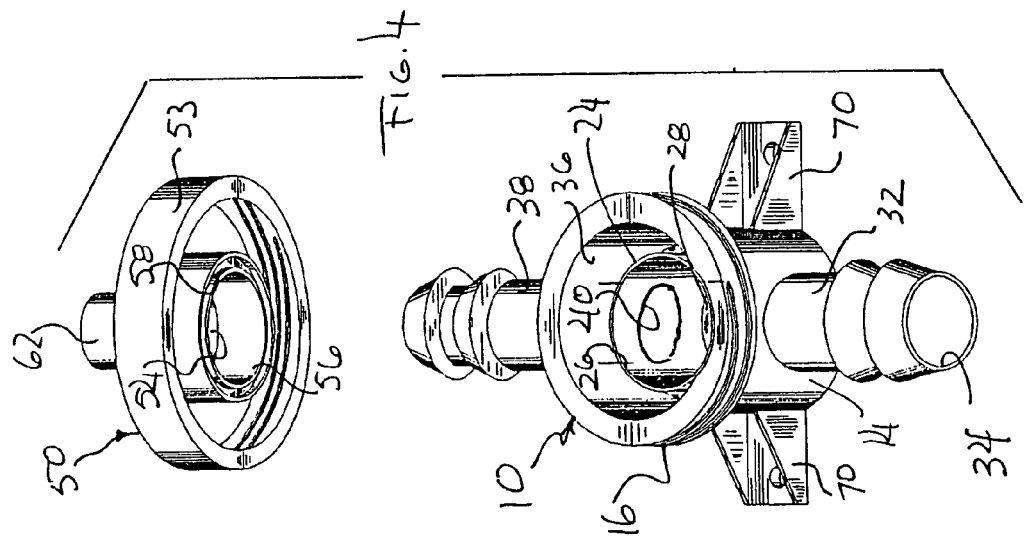
FIG. 4 is an exploded perspective view depicting a liquid treatment assembly embodying the invention.

As indicated by the open arrow, liquid flowing through the inlet conduit 34 passes into the interior space between the sidewall 37 and the cylindrical wall 24, necessarily flowing therefrom through the strainer 42 and into the well 26 and exiting through the outlet conduit 40. In this manner the assembly functions to effect filtration of liquids passing through a plumbing system in which the device is installed In accordance with the present invention, and as is shown in detail in FIGS. 2 and 4, the cap 12 and strainer 42 of the conventional filter device are replaced by an adapter, generally designated by the numeral 50. In the preferred embodiment illustrated, the adapter 50 is a one-piece molded plastic part comprised of an end wall 51 and a circumferential threaded flange 53, which flange cooperates with the threaded lip 16 on the base 10 to secure the two components in sealed assembly. Laterally extending ears 70, for mounting the base 10, are also shown in FIG. 4.

A cylindrical wall 52 depends from the end wall 51 of the adapter in concentric relationship to the flange 53, and an upstanding nipple 60 defines a concentric inlet conduit 62 into the well 54. The depending wall 52 and the upstanding cylindrical wall 24 on the base 10 are of the same nominal diameter, and they are coaxially arranged such that the rim of the wall 52 engages the rim of the wall 24 to thereby cooperatively define an inner compartment within the assembly; the end surface of the wall 52 is formed with a circumferential groove 58 for the receipt of a sealing ring.

As indicated by the open arrow in FIG. 2, liquid introduced into the inlet conduit 62 flows through the inner chamber 26, 54 and exits through the conduit 40, with the cooperating mated wall structures 24, 52 simultaneously blocking the flow of any liquid present within the outer chamber 36. The conventional strainer device is thus converted for the introduction into the system of a liquid from an independent source.

Figure 6:
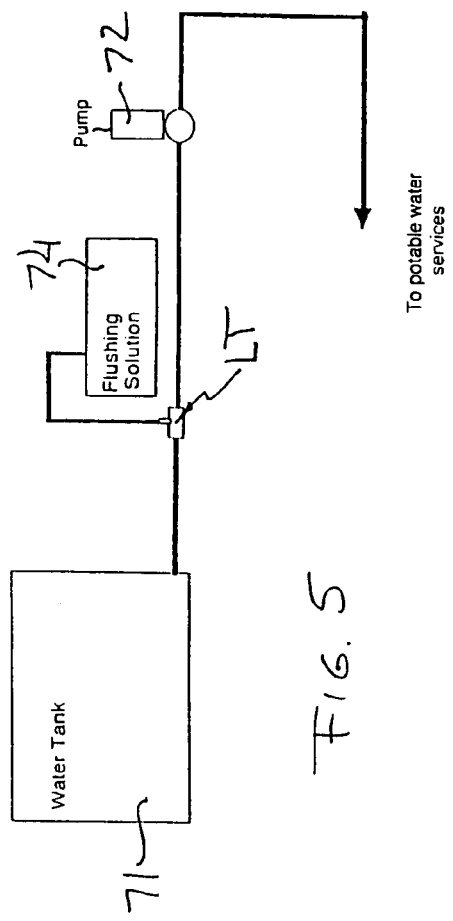

Such adaptation is depicted in FIGS. 5 and 6, wherein the liquid treatment unit, in both its unconverted (filtering) and converted (flushing) configurations, is designated "LT." In the former arrangement water is normally withdrawn from the tank 71 under the influence of the pump 72 and is delivered as potable water using an in-line filter of the kind depicted in FIG. 1. By substituting the adapter 50 for the filter components, a flushing solution can be withdrawn from a supply 74 under the influence of the same pump 72, in lieu of water from the tank 71, to thereby flush the downstream portions of the system.

Similarly, in the arrangement of FIG. 6 water is normally withdrawn from a well 75, under the influence of the pump 76, and again delivered to potable water services. Reconfiguring the device by substituting the instant adapter permits a flushing solution to be delivered through the downstream portions of the system, utilizing however a temporary pump 78 for that purpose.

Although the adapter of the invention will desirably be one-piece molded construction and comprised of concentrically arranged elements of circular cross section, as described, it may take other suitable forms if so preferred. Similarly, while threaded interengagement of parts will usually constitute the preferred mode of assembly, other such means (e.g., snap-fitting elements, lugs that interengage upon relative rotation, etc.) may be employed as well.

Thus it can be seen that the present invention provides a novel adapter which is quickly and conveniently assembled with the base of a conventional in-line strainer device, for readily converting it to a liquid treatment assembly for flushing of a plumbing system in which the device is installed. The invention also provides a novel liquid treatment assembly, and a novel method for flushing a plumbing system, which normally utilize the installed base component of a conventional in-line strainer device.

Having thus described the invention, what is claimed is:

1. A method for treating liquid in a plumbing system, comprising the steps:

providing apparatus including a base, an adapter, a strainer member, and a cap member, said base and adapter being constructed for disengageable assembly with one another to cooperatively define a system flushing chamber; said base and said adapter each including an interior wall structure having a mouth portion thereon, said mouth portions of said interior wall structures confronting and engaging one another so that said interior wall structures cooperate with one another to define, within said flushing chamber, an inner compartment and an outer compartment, said base having outlet-defining means, in liquid flow communication with said inner compartment through said interior wall structure of said base, and inlet-defining means in liquid flow communication with said outer compartment, and said adapter having inlet-defining means establishing liquid flow communication only between said inner compartment and the exterior of said assembly, said base inlet-defining means being in flow communication with said base outlet-defining means across said mouth portion of said interior wall structure of said base in the absence of said adapter; whereby, in said base and adapter assembly a liquid flow path is established from said adapter inlet-defining means to said base outlet-defining means through said inner compartment, and flow is blocked through said base inlet defining means; said strainer member being constructed to seat over said mouth portion of said interior wall structure of said base, and said cap member being constructed for disengagable assembly with said base to enclose said strainer member, so seated, and to define cooperatively with said base a filtering chamber;

installing said base in a plumbing system with said base inlet-defining means connected to receive liquid to be treated and said base outlet-defining means connected to discharge treated liquid;

seating said strainer member over said mouth portion of said interior wall structure of said base, and assembling said cap member with said base to configure said apparatus for filtering and to cooperatively define said filtering chamber;

introducing liquid to be treated into said base inlet-defining means while withdrawing liquid from said base outlet-defining means, said liquid passing sequentially from said base inlet-defining means into said outer compartment, through said strainer member, into said inner compartment, and through said base outlet-defining means;

removing said cap member and strainer member from said base, and assembling said adapter with said base to configure said apparatus for flushing of said system and to cooperatively define said flushing chamber; and introducing a treating liquid into said adapter inlet-defining means for passage into said plumbing system sequentially through said inner compartment and said base outlet-defining means.

2. The method of claim 1 wherein said treating liquid flushes said plumbing system.

3. The method of claim 2 wherein said treating liquid is an antifreeze liquid.

* * * * *